US010336288B2

(12) United States Patent
Izuma

(10) Patent No.: US 10,336,288 B2
(45) Date of Patent: Jul. 2, 2019

(54) IGNITION DEVICE AND GAS GENERATOR USING SAME

(71) Applicant: DAICEL CORPORATION, Osaka-shi, Osaka (JP)

(72) Inventor: Toshihiro Izuma, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 32 days.

(21) Appl. No.: 15/578,927

(22) PCT Filed: Jun. 9, 2016

(86) PCT No.: PCT/JP2016/067262
§ 371 (c)(1),
(2) Date: Dec. 1, 2017

(87) PCT Pub. No.: WO2017/006697
PCT Pub. Date: Jan. 12, 2017

(65) Prior Publication Data
US 2018/0170303 A1 Jun. 21, 2018

(30) Foreign Application Priority Data
Jul. 3, 2015 (JP) .................................. 2015-134086

(51) Int. Cl.
B60R 22/34 (2006.01)
B60R 21/264 (2006.01)
B60R 21/26 (2011.01)

(52) U.S. Cl.
CPC .......... *B60R 21/264* (2013.01); *B60R 21/26* (2013.01); *B60R 21/2644* (2013.01);
(Continued)

(58) Field of Classification Search
CPC ... B60R 21/264; B60R 21/26; B60R 21/2644; B60R 2021/2642; B60R 2021/2648
See application file for complete search history.

(56) References Cited

U.S. PATENT DOCUMENTS 5,544,916 A * 8/1996 Thuen ................. B60R 21/2644
280/741
5,847,310 A * 12/1998 Nagahashi .......... B60R 21/2644
102/202.6
(Continued)

FOREIGN PATENT DOCUMENTS

JP 60-101289 U 7/1985
JP 7-164998 A 6/1995
(Continued)

*Primary Examiner* — Joshua T Semick
(74) *Attorney, Agent, or Firm* — Birch, Stewart, Kolasch & Birch, LLP

(57) ABSTRACT

An ignition device includes an igniter fixed to an igniter collar, a first cup member filled with a gas generating component therein, and a second cup member. The first cup member covers the igniter collar to enclose a portion including an ignition portion of the igniter. The second cup member covers the igniter collar to enclose the first cup member. A gap is formed between an outer surface of the first cup member and an inner surface of the second cup member to function as a heat insulating layer. The first cup member has a first opening, and the second cup member has a second opening. At least one of the first opening and the second opening is closed before actuation and is opened only when gas is generated from the gas generating component.

9 Claims, 4 Drawing Sheets

(52) U.S. Cl.
CPC .... *B60R 22/34* (2013.01); *B60R 2021/26029* (2013.01); *B60R 2021/2642* (2013.01); *B60R 2021/2648* (2013.01)

(56) References Cited

U.S. PATENT DOCUMENTS

| | | | |
|---|---|---|---|
| 6,032,979 | A | 3/2000 | Mossi et al. |
| 6,301,892 | B1 | 10/2001 | Narumi et al. |
| 7,883,111 | B2 * | 2/2011 | Blessing ............. B60R 21/2644 102/530 |
| 2002/0001785 | A1 | 1/2002 | Koga et al. |
| 2002/0189487 | A1 * | 12/2002 | Kubo ................. B60R 21/2644 102/530 |
| 2007/0085314 | A1 | 4/2007 | Matsuda et al. |
| 2007/0186797 | A1 | 8/2007 | Kurita et al. |
| 2007/0193464 | A1 | 8/2007 | Hironaka et al. |
| 2011/0239891 | A1 | 10/2011 | Nakayasu |
| 2018/0154859 | A1 * | 6/2018 | Kubo ................... B60R 21/264 |

FOREIGN PATENT DOCUMENTS

| | | | |
|---|---|---|---|
| JP | 8-48130 | A | 2/1996 |
| JP | 10-59437 | A | 3/1998 |
| JP | 2000-292100 | A | 10/2000 |
| JP | 2001-353438 | A | 12/2001 |
| JP | 2005-280515 | A | 10/2005 |
| JP | 2005-280585 | A | 10/2005 |
| JP | 2007-118788 | A | 5/2007 |
| JP | 2007-131077 | A | 5/2007 |
| JP | 2008-68792 | A | 3/2008 |
| JP | 2011-207326 | A | 10/2011 |
| WO | WO 2011/122510 | A1 | 10/2011 |

* cited by examiner

[Fig. 1]
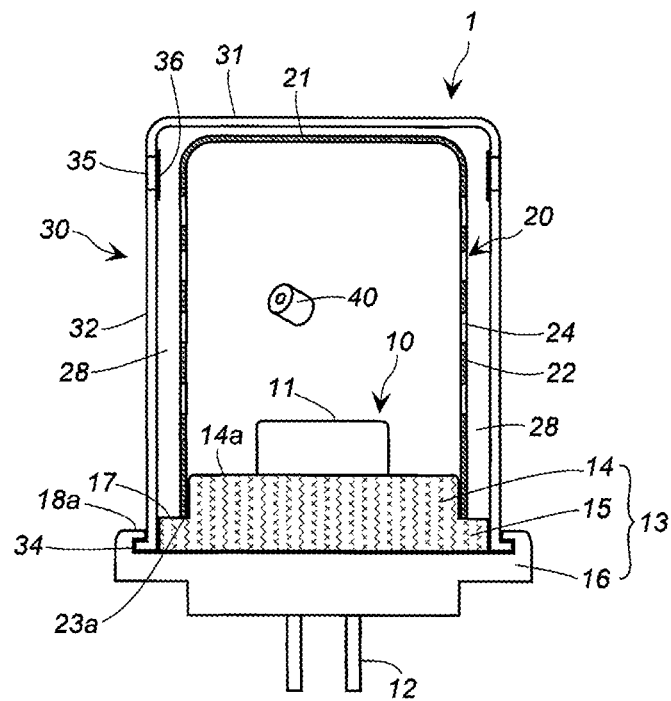
(a)
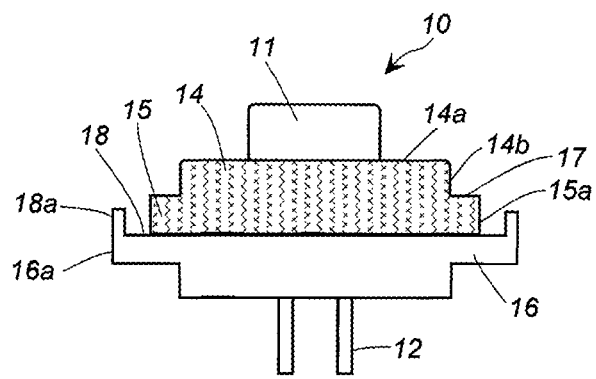
(b)

[Fig. 2]
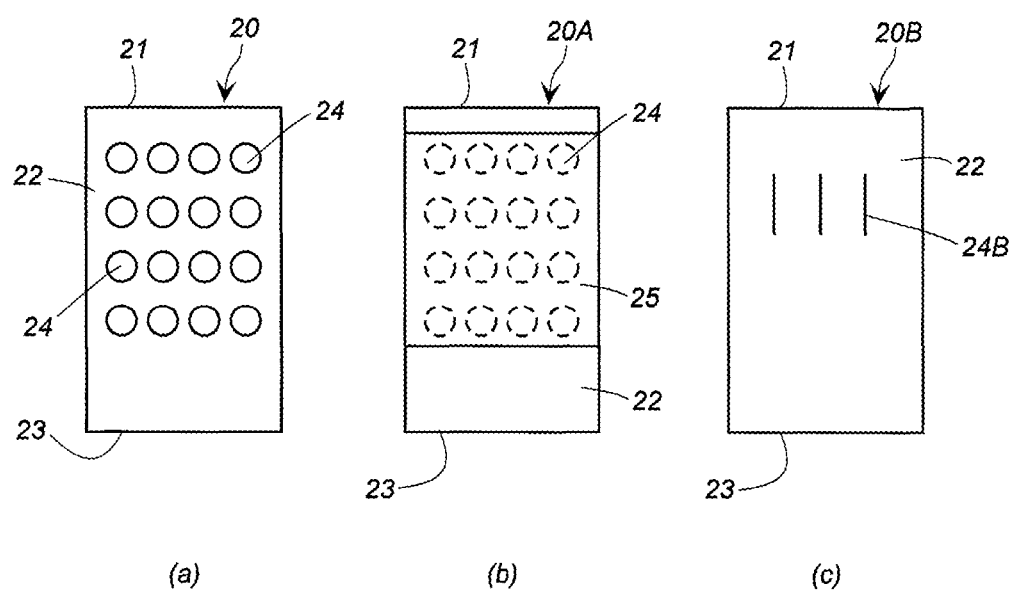
(a)　　　　(b)　　　　(c)

[Fig. 3]
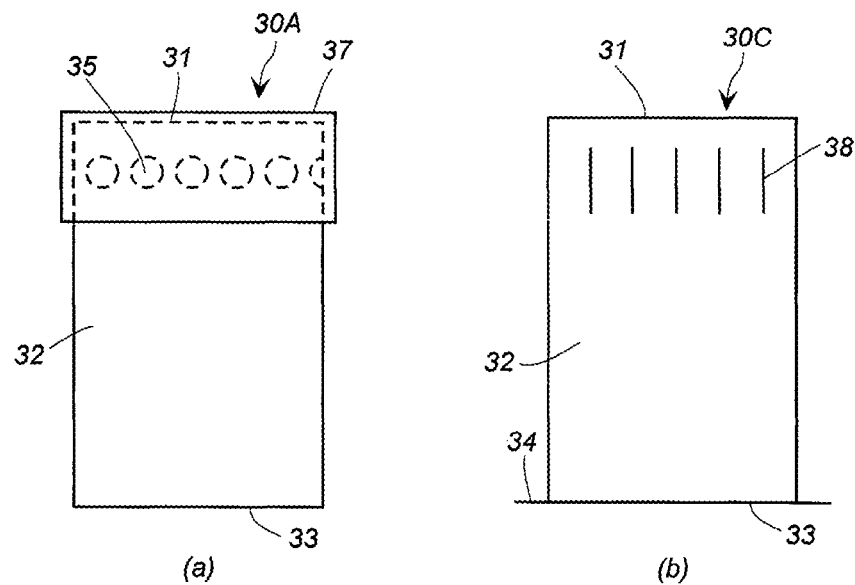
[Fig. 4]
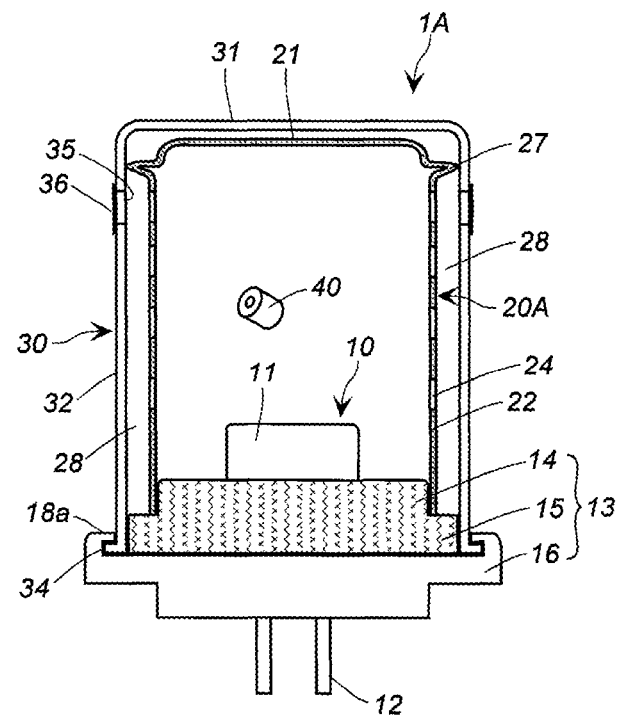

[Fig. 5]
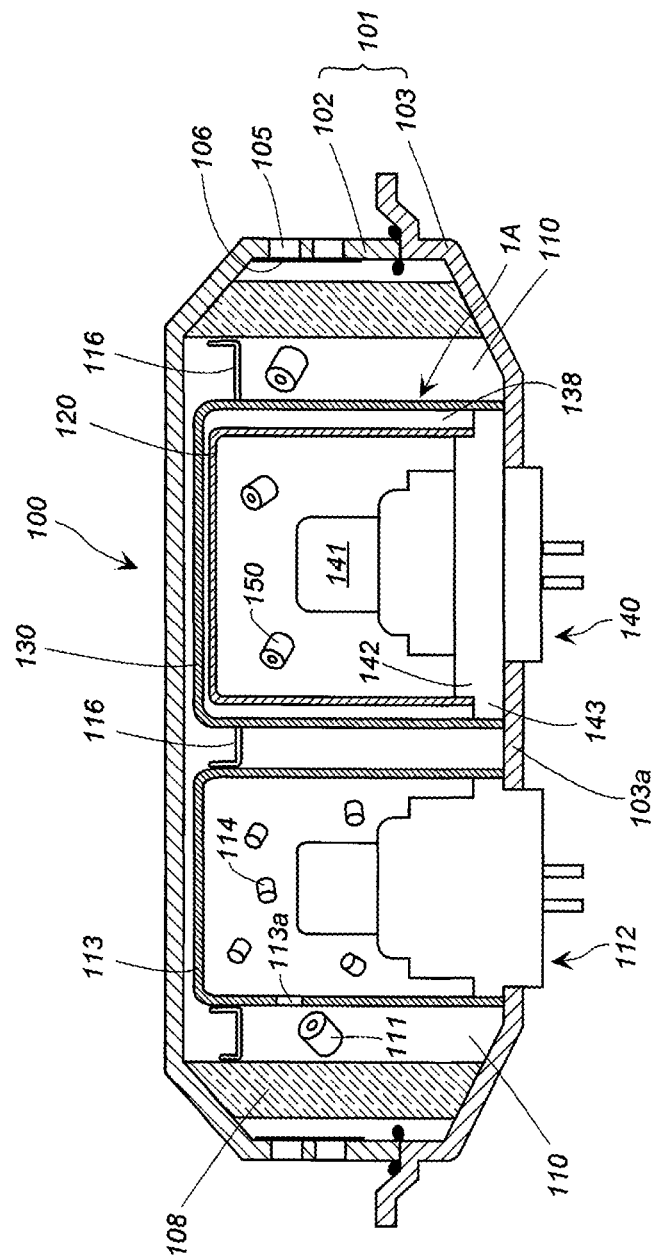

IGNITION DEVICE AND GAS GENERATOR USING SAME

FIELD OF INVENTION

The present invention relates to an ignition device usable as an igniter for various gas generators, and a gas generator using the same.

DESCRIPTION OF THE RELATED ART

As a gas generator in which a gas generating agent is used as a gas source, such a gas generator is used that includes two combustion chambers accommodating a gas generating agent respectively, and two igniters for igniting and burning the respective gas generating agents.

In such a gas generator, when one of the igniters is actuated and the gas generating agent accommodated in one of the combustion chambers is ignited and burnt, it is necessary to ensure that combustion heat thereof does not ignite the gas generating agent in the other combustion chamber.

U.S. Pat. No. 6,032,979 discloses a dual-type gas generator which includes a first igniter assembly 54 and a second igniter device 90 in a housing 12 formed by a base portion 14 and a diffuser cap portion 16.

A second combustion chamber 82, which includes the second igniter device 90, is positioned inside a cup member 84 disposed in a first combustion chamber 34, and is filled with a second gas generant material 86. Moreover, an insulator barrier material 106 is disposed in a portion of an outer side (a circumferential wall) of the cup member 84.

The insulator barrier material 106 functions such that the second gas generant material 86 disposed in the second combustion chamber 82 is prevented from coming in contact with a combustion product of a first gas generant material (in order to prevent the second gas generant material form starting combustion by the contact). The insulator barrier material 106 ruptures when the second gas generant material 86 is burnt, and the insulator barrier material 106 also functions to supply a combustion product of the second gas generant material 86 to the first combustion chamber 34.

As a specific material of the insulator barrier material 106, a fiberglass containing adhesive-backed foil tape is listed.

SUMMARY OF THE INVENTION

The present invention provides an ignition device, including: an igniter fixed to an igniter collar; a first cup member filled with a gas generating component therein; and a second cup member, the first cup member covering the igniter collar so as to enclose a portion including an ignition portion of the igniter, the second cup member covering the igniter collar so as to enclose the first cup member, a gap being formed between an outer surface of the first cup member and an inner surface of the second cup member to function as a heat insulating layer, the first cup member having a first opening means, and the second cup member having a second opening means, and at least one of the first opening means and the second opening means being closed before actuation and being opened only when gas is generated from the gas generating component.

Further, the present invention provides a gas generator which uses the above ignition device.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows, in (a), an axial sectional view of an ignition device according to the present invention, and in (b), an axial section view of an igniter and an igniter collar depicted in (a);

FIG. 2 shows, in (a), a front view of a first cup member used in the ignition device depicted in (a) in FIG. 1, and in (b) and (c), a front view of a first cup member according to another embodiment;

FIG. 3 shows, in (a) and (b), a front view of a second cup member of an embodiment other than that depicted in (a) in FIG. 1;

FIG. 4 shows an axial sectional view of an ignition device of an embodiment other than that depicted in (a) in FIG. 1; and FIG. 5 shows an axial sectional view of a dual-type gas generator in which the ignition device according to the present invention is used.

DETAILED DESCRIPTION OF INVENTION

In the invention of U.S. Pat. No. 6,032,979, in order to prevent the cup member 84 from coming in contact with the combustion product of the first gas generant material 36, it is preferable that an entire surface of the cup member 84 is covered by the insulator barrier material 106. However, it is difficult to cover the entire surface with the fiberglass containing adhesive-backed foil tape.

Accordingly, as depicted in FIG. 1, there is no choice but to employ a method of covering only a circumferential wall surface with the fiberglass containing adhesive-backed foil tape, which does not sufficiently exhibit an insulating barrier function.

The present invention provides an ignition device which is easily assembled and is hardly affected by thermal influence from an external atmosphere, and a gas generator which uses the same.

An electric igniter used in a known gas generator for an airbag apparatus, can be used as the igniter.

The igniter includes an igniter main body having an ignition portion, and an electroconductive pin protruding from the igniter main body.

Part of of the igniter main body of the igniter is fixed by a metallic igniter collar.

A first cup member includes a bottom surface, a circumferential wall, and an opening located to face the bottom surface.

A gas generating component is accommodated in the first cup member.

As the gas generating component, a transfer charge used for an igniter of a known gas generator for an airbag apparatus, a gas generating agent used in the known gas generator, known black powder, known smokeless powder, and the like may be used.

A second cup member includes a bottom surface, a circumferential wall, and an opening located to face the bottom surface.

The second cup member is larger than the first cup member, and the first and second cup members cover the igniter such that the first cup member is on the inner side and the second cup member is on the outer side. Thereby, a gap (an air layer) is formed between the bottom surfaces and the circumferential walls thereof.

Since air is highly effective for heat insulating, the gap functions as a heat insulating layer.

The first cup member has a first opening means. The first opening means is preferably formed in the circumferential wall, but the first opening means may be formed in the bottom surface, or may be formed in both the circumferential wall and the bottom surface.

The second cup member has a second opening means. The second opening means is preferably formed in the circumferential wall, but the second opening means may be formed in the bottom surface, or may be formed in both the circumferential wall and the bottom surface.

The first opening means of the first cup member and the second opening means of the second cup member may be formed at positions facing each other, or may be formed at different positions.

Since the gas generating component is accommodated in the first cup member, in order to become hardly affected by a thermal influence from the outside, one of the first and second opening means is closed before actuation and is opened only when gas is generated from the gas generating component.

The opening device which is opened only when the gas is generated can be:

a through-hole provided in a cup member (a first cup member or a second cup member) in a thickness direction and a closing member closing the through-hole, such as a metallic seal tape; and a fragile portion (for example, a notch portion or a thinner portion) formed in a cup member (a first cup member or a second cup member).

In the present invention, both the first opening means of the first cup member and the second opening means of the second cup member may be adapted to open only when gas is generated, and preferably, only the second opening means of the second cup member is adapted to open only when gas is generated.

One embodiment of the present invention provides a gas generator for a seat belt retractor including the above-described ignition device.

The ignition device of the present invention is used as an ignition device of a known gas generator for an airbag apparatus.

Moreover, the ignition device of the present invention may be used as an independent gas generator and may be used as a gas generator for a seat belt retractor, for example.

In one embodiment, the present invention is the ignition device wherein the first cup member and the second cup member are arranged such that a first projection formed on the outer surface of the first cup member is abutted against the inner surface of the second cup member, or a second projection formed on the inner surface of the second cup member is abutted against the outer surface of the first cup member.

The gap (the air layer) that functions as a heat insulating layer is obtained between the first cup member and the second cup member.

However, when the second cup member is inclined to be in contact with the first cup member upon receiving a pressure including heat from the outside, it is conceivable that the gap does not function as the heat insulating layer sufficiently.

If one of the first projection and the second projection is provided as described above, the gap maintains the function of the heat insulating layer even when the above-described problem occurs.

As the first projection and the second projection, a combination of a plurality of independent projections, or one or two or more annular projections may be used. The combination of the plurality of independent projections is preferable from the perspective of reducing heat transferred from the second cup member to the first cup member.

When the combination of the plurality of independent projections is provided, approximately two to eight projections formed at equal intervals in a circumferential direction may be used, or the approximately two to eight projections may be formed in a plurality of stages in a height direction. The first projection portion or the second projection portion may be formed on the circumferential wall near the bottom surface of the first cup member or the second cup member.

In one embodiment, the present invention is the ignition device wherein the first cup member is made of a material having a lower thermal conductivity than the second cup member.

In one embodiment, the present invention is the ignition device wherein the first cup member is made of a resin and the second cup member is made of a metal.

With the above-described combination of the first cup member and the second cup member, the second cup member on the outer side is hard to be thermally deformed even when it is affected by thermal influence from the outside. Moreover, such a function is enhanced that prevents erroneous ignition of the gas generating component accommodated in the first cup member because of the heat insulating effect of both the gap (the air layer) and the first cup member.

When the first cup member is a resin and the second cup member is metal, the first projection portion is preferably formed on the first cup member only to maintain the gap (the air layer) in order to prevent damage to the first cup member.

In one embodiment, the present invention is the ignition device wherein the igniter collar has a metal portion and a low thermal conductivity portion made of a material having a lower thermal conductivity than the metal of the metal portion, and an opening of the first cup member and an inner circumferential wall at the opening thereof are in contact with the low thermal conductivity portion.

As described above, because of the gap (the air layer) obtained between the first cup member and the second cup member, the cup members are not in contact with each other. However, the cup members are in indirect contact with each other via the metallic igniter collar, since the openings thereof are in contact with the metallic igniter collar.

Thereby, a heat (a temperature rise) of the second cup member that is affected by thermal influence from the outside is transferred to the first cup member via the metallic igniter collar.

When the low thermal conductivity portion is formed in the igniter collar and the opening of the first cup member and the inner circumferential wall at the opening is abutted against the low thermal conductivity portion, the heat (the temperature rise) of the second cup member is hardly transferred to the first cup member.

The low thermal conductivity portion is preferably made of a resin, ceramics, or rubber such as silicon rubber.

In one embodiment, the present invention is the ignition device wherein the igniter collar has a smaller diameter portion, an intermediate diameter portion, and a larger diameter portion arranged in that order from the ignition portion in ascending order of outer diameters, the larger diameter portion is made of metal, and at least the smaller diameter portion includes a low thermal conductivity portion made of a material having a lower thermal conductivity than the metal of the metal portion, a first annular surface is formed between the smaller diameter portion and the intermediate diameter portion, being obtained by a difference in outer diameters thereof, and a second annular surface is formed between the intermediate diameter portion and the larger diameter portion, being obtained by a difference in outer diameters thereof, and the first cup member has an opening abutting against the first annular surface, and an inner circumferential wall at the opening is press-fitted to the smaller diameter portion.

The igniter collar used for the ignition device has the smaller diameter portion, the intermediate diameter portion and the larger diameter portion arranged in that order from the ignition portion in ascending order of outer diameters, and the smaller diameter portion includes the low thermal conductivity portion made of a material having a lower thermal conductivity than the metal of the metal portion. Thereby, an attachment operation of the first cup member is facilitated and a heat insulating effect is enhanced.

Moreover, from the perspective of enhancing the heat insulating effect, it is preferable that both the smaller diameter portion and the intermediate diameter portion includes a low thermal conductivity portion made of a material having a lower thermal conductivity than the metal of the metal portion.

As a method of attaching the second cup member, a method of press-fitting the second cup member to the intermediate diameter portion of the igniter collar, a method of fixing the second cup member by crimping the larger diameter portion, and a method of overlaying, press-fitting, or adhesively attaching the second cup member to the circumferential wall of the first cup member or the bottom surface and the circumferential wall thereof.

One embodiment of the present invention provides a gas generator including, in a housing having a gas discharge port: an ignition device; and a combustion chamber filled with a gas generating agent, wherein the above-described ignition device is used as the ignition device.

One embodiment of the present invention provides a gas generator including, in a housing having a gas discharge port: an ignition device; a first combustion chamber filled with a first gas generating agent; and a second combustion chamber filled with a second gas generating agent, wherein the above-described ignition device is used as the second combustion chamber.

An advantageous effect of the ignition device of the present invention is remarkably exhibited in a dual-type gas generator having a first combustion chamber and a second combustion chamber. However, the present invention can be applied to a single-type gas generator having a single combustion chamber.

When the ignition device of the present invention is applied to a dual-type gas generator, the ignition device is used as the second combustion chamber.

In this case, the gas generating component accommodated in the first cup member of the ignition device is used as a gas generating agent which corresponds to a second gas generating agent in a second combustion chamber.

With the ignition device of the present invention used as the second combustion chamber, even when the first gas generating agent in the first combustion chamber is burnt first and a high temperature state is created inside the housing, the heat insulating effect of the gap (the air layer) is exhibited, so that erroneous ignition of the gas generating agent in the second combustion chamber (in the first cup member of the ignition device) is prevented.

The ignition device of the present invention has the gap (the air layer) between the first cup member filled with a gas generating component and the second cup member arranged on the outer side of the first cup member.

Thereby, even when heat is applied from the outside, transfer of heat to the inside of the first cup member is suppressed by the heat insulating effect of the gap, and thereby, the gas generating component in the first cup member is prevented from being erroneously burnt by the heat from the outside.

The ignition device of the present invention is usable as a gas generator for seat belt retractors, an ignition device for a gas generator, and a combustion chamber for a gas generator.

EMBODIMENTS OF THE INVENTION

<Ignition Device in FIG. 1>

An ignition device 1 depicted in (a) in FIG. 1 includes an igniter 10, a first cup member 20 and a second cup member 30.

The igniter 10 has an igniter main body including the ignition portion 11 and an electroconductive pin 12 protruding from the igniter main body.

A portion of the igniter main body including the ignition portion 11 of the igniter 10 is fixed by an igniter collar 13.

As depicted in (a) and (b) in FIG. 1, the igniter collar 13 has a smaller diameter portion 14, an intermediate diameter portion 15, and a larger diameter portion 16 arranged in that order from the ignition portion 11 in ascending order of outer diameters.

Since the smaller diameter portion 14 and the intermediate diameter portion 15 are made of a resin and the larger diameter portion 16 is made of metal, the smaller diameter portion 14 and the intermediate diameter portion 15 have a lower thermal conductivity than the larger diameter portion 16.

The smaller diameter portion 14 and the intermediate diameter portion 15 may be formed such that an inner side thereof is made of metal integrated with the larger diameter portion 16 and the outer side is coated with a resin.

A polyamide-based resin (for example, nylon 6-12), a polyimide-based resin, or the like may be used as the resin, and aluminum, iron, stainless steel, or the like may be used as the metal.

The smaller diameter portion 14 has a planar portion 14a, from which the ignition portion 11 protrudes, and a first annular wall surface 14b.

The intermediate diameter portion 15 has a first annular planar portion 17 obtained by a difference in the outer diameters between the intermediate diameter portion 15 and the smaller diameter portion 14, and a second annular wall surface 15a provided vertically downward (toward the electroconductive pin 12) from the first annular planar portion 17.

The larger diameter portion 16 has a second annular planar portion 18 obtained by a difference in the outer diameters between the larger diameter portion 16 and the intermediate diameter portion 15, and a third annular wall portion 16a provided vertically downward (toward the electroconductive pin 12) from the second annular planar portion 18.

The larger diameter portion 16 has an annular protruding portion (a crimping portion) 18a on the second annular planar portion 18 at the third annular wall portion 16a.

As depicted in FIG. 1 and in (a) in FIG. 2, the first cup member 20 has a bottom surface 21, a circumferential wall 22, and an opening 23 located to face the bottom surface 21 in an axial direction. The bottom surface 21 may be a member separate from the circumferential wall 22.

An inner circumferential surface of the first cup member 20 at the opening 23 is press-fitted to the first annular wall surface 14b, and an annular end 23a of the opening 23 is abutted against the first annular planar portion 17.

A known gas generating agent 40, which serves as a gas generating component, is densely filled inside the first cup member 20.

The ignition portion 11 of the igniter 10 is enclosed by the first cup member 20 and is in contact with the gas generating agent 40.

As depicted in (a) in FIG. 1 and in (a) in FIG. 2, the circumferential wall 22 of the first cup member 20 is provided with a plurality of through-holes 24 serving as a first opening means. The through-holes 24 pass through the circumferential wall 22 in the thickness direction and are open.

The plurality of through-holes 24 are arranged such that the through-holes formed at equal intervals in a circumferential direction are defined as one group, and a plurality of such groups of through-holes are formed at intervals in a height direction.

The first cup member 20 may be embodied as depicted in (b) and (c) in FIG. 2 instead of the embodiment having the through-holes 24 depicted in (a) in FIG. 1 and in (a) in FIG. 2.

In a first cup member 20A depicted in (b) in FIG. 2, the plurality of through-holes 24 of the first cup member 20 depicted in (a) in FIG. 2 are closed by a seal tape 25 from the outside. All through-holes 24 are closed by a single seal tape 25 in (b) in FIG. 2, but a plurality of seal tapes may be used. During actuation, the seal tape 25 is ruptured, whereby the through-holes 24 are opened.

A first cup member 20B depicted in (c) in FIG. 2 has a plurality of fragile portions 24B instead of the through-holes 24 depicted in (a) and (b) in FIG. 2. The plurality of the fragile portions 24B are formed by a notch portion or a thinner portion and are closed before actuation and ruptured to be open during actuation. In (c) in FIG. 2, the linear fragile portions are formed, but a circular fragile portion (for example, a fragile portion formed at a circumference of a circle, or an entire inside of a circle reduced in thickness) may be formed.

As depicted in (a) in FIG. 1, FIG. 3 and FIG. 4, the second cup member 30 has a bottom surface 31, a circumferential wall 32, and an opening 33 located to face the bottom surface 31 in an axial direction, and further, a flange 34 is formed at the opening 33. The bottom surface 31 may be a member separate from the circumferential wall 32.

In the second cup member 30, an inner circumferential surface at the opening 33 is abutted against the second annular wall surface 15a and the flange 34 is abutted against the second annular planar portion 18, and then the annular protruding portion (the crimping portion) 18a is bent to fix the flange 34.

The second cup member 30 may not be formed with the flange 34, and the second cup member 30 may be press-fitted and fixed similarly to the first cup member 20, such that the inner circumferential surface at the opening 33 is abutted against the second annular wall surface 15a and the annular end of the opening is abutted against the second annular planar portion 18 (FIG. 5).

As depicted in (a) in FIG. 1, the circumferential wall 32 of the second cup member 30 is provided with a plurality of through-holes 35 serving as a second opening means.

The through-holes 35 pass through the circumferential wall 32 in a thickness direction and are closed by the seal tape 36 from the inside. The seal tape 36 may be attached from the outside. During actuation, the seal tape 36 is ruptured to open the through-holes 35.

The second cup member 30 may be embodied as depicted in (a) and (b) in FIG. 3 instead of the embodiment having the through-holes 35 depicted in (a) in FIG. 1.

A second cup member 30A depicted in (a) in FIG. 3 is an embodiment in which a seal cup 37 is used instead of the seal tape 36 of the second cup member 30 depicted in (a) in FIG. 1. During actuation, the seal cup 37 is ruptured or deformed to open the through-holes 35. An example of the seal cup 37 can be a member corresponding to a cup-shaped thin-film member 147 depicted in FIG. 4 in JP-A No. 2007-131077 or a member corresponding to a cup-shaped thin-film member 147 in JP-A No. 2007-118788.

A second cup member 30C depicted in (b) in FIG. 3 has a plurality of fragile portions 38 instead of the through-holes 35 depicted in (a) in FIG. 1 and in (a) in FIG. 3. The plurality of the fragile portions 38 are formed by a notch portion or a thinner portion, closed before actuation and ruptured to be open during actuation. In both (a) in FIG. 1 and FIG. 4, the through-holes 35 and the fragile portions 38 may be formed at positions that do not overlap the through-holes 24 of the first cup member when the through-holes and the fragile portions are opened.

Either or both of the through-holes 24 of the first cup member 20 and the through-holes 35 (or the fragile portions 38) of the second cup member 30 are closed before actuation, in order to secure a moisture-proof property for the gas generating agent 40 densely filled in the first cup member 20.

Therefore, for example, when a cup member depicted in (b) or (c) in FIG. 2 is used as the first cup member 20, the through-holes 35 in the second cup member 30 may be open, not closed.

A gap 28 is formed to serve as a heat insulating layer between an outer surface of the circumferential wall 22 of the first cup member 20 and an inner surface of the circumferential wall 32 of the second cup member 30.

A distance of the gap 28 is preferably uniform. However, for example, in case that the ignition device 1 of the present invention is employed in a gas generator in which the bottom surface 31 (the bottom surface 21) is in contact with or close to the housing of the gas generator and therefore the ignition device 1 is hardly affected by thermal influence due to combustion of a gas generating agent, the gap between the circumferential wall 22 and the circumferential wall 32 can be relatively large and the gap between the bottom surface 21 and the bottom surface 31 can be relatively small.

The distance of the gap 28 may be adjusted in the range of 0.5 to 2 mm, for example.

The ignition device depicted in (a) in FIG. 1 may be used as a gas generator for a seat belt retractor and may be used as an ignition device or a combustion chamber, which includes an igniter and a gas generating agent, in a known gas generator for an airbag apparatus.

The ignition device 1 of the present invention has the gap 28 that serves as a heat insulating layer when the ignition device is subject to thermal influence from the outside.

As in the embodiment depicted in (a) in FIG. 1, since the first cup member 20 is abutted against the smaller diameter portion 14 and the intermediate diameter portion 15 made of a resin, and is not abutted against the larger diameter portion 16 made of metal, a temperature rise in the first cup member 20 due to thermal conduction from the larger diameter portion 16 is prevented.

Thereby, even when the ignition device is subjected to thermal influence from the outside, erroneous ignition of the gas generating agent 40 in the first cup member 20 is prevented.

<Ignition Device in FIG. 4>

An ignition device 1A depicted in FIG. 4 is the same as the ignition device 1 depicted in (a) in FIG. 1 except that a first cup member 20A in part and an attaching position of the seal tape 36 are different from the first cup member 20 of (a) in FIG. 1.

The first cup member 20A has a plurality of independent projections 27 which are formed on a circumferential wall 22 at a position close to a bottom surface 21 at equal intervals in a circumferential direction so as to project radially outward.

Distal ends of the plurality of independent projections 27 are abutted against an inner surface of a circumferential wall 32 of a second cup member 30.

The plurality of independent projections 27 may be formed at different height positions in the axial direction.

Four independent projections 27 are formed in FIG. 4, and three to six projections 27 are sufficient. A continuous annular projection may be used instead of the independent projections 27.

When the first cup member 20A is made of a resin, the first cup member 20A and the projections 27 may be integrally molded.

The independent projection portions 27 are formed only on the first cup member 20A in FIG. 4, but the projections 27 may project radially inward from an inner surface of the circumferential wall 32 of the second cup member 30 and be abutted against an outer surface of the circumferential wall 22 of the first cup member 20.

Furthermore, the projections 27 may project from both the first cup member 20 and the second cup member 30 to be abutted against each other.

As depicted in FIG. 4, a distance of a gap (the air layer) 28 is maintained by an igniter collar 13 on the lower side of the first and second cup members 20 and 30, and because the plurality of independent projections 27 are arranged on the first cup member 20, the distance of the gap (the air layer) 28 is also maintained on the upper side of the first and second cup members 20 and 30.

Thereby, even when the second cup member 30 is inclined upon receiving pressure including heat from the outside, the distance of the gap (the air layer) 28 is maintained and a heat insulating function is exhibited.

<Gas Generator in FIG. 5>

A gas generator 100 in FIG. 5 is the same as a known pyrotechnic dual-type gas generator (for example, FIG. 1 in JP-A No. 2011-207326) except that the ignition device of the present invention is used therein.

A housing 101 is obtained by welding and integrating a diffuser shell 102 which has a gas discharge port 105, and a closure shell 103.

The gas discharge port 105 is closed by a seal tape 106 from the inside.

A cylindrical coolant-filter 108 is disposed in the housing 101 with a distance from a gas discharge port 105.

An inside of the coolant-filter 108 is a first combustion chamber 110 filled with a first gas generating agent 111.

A first ignition device chamber cup 113 provided with a through-hole 113a in a circumferential surface is disposed in the first combustion chamber 110. A first igniter 112 and a gas generating agent 114 for an ignition device, which also functions as a transfer charge are accommodated in the first ignition device chamber cup 113.

The ignition device 1A of the present invention is disposed as a second combustion chamber in a space of the first combustion chamber 110 excluding the first ignition device chamber cup 113 and the first gas generating agent 111.

The ignition device 1A is the same as the ignition device 1 depicted in (a) in FIG. 1 except that an attachment structure of the second cup member and an igniter collar is different.

In the ignition device 1A, a first cup member 120 is disposed so as to enclose an ignition portion 141 of an igniter 140, and a second cup member 130 is disposed on the outside thereof with a gap (an air layer) 138.

The first cup member 120 is press-fitted to a smaller diameter portion 142 of an igniter collar.

The second cup member 130 is press-fitted to an intermediate diameter portion 143 of the igniter collar, and an opening thereof is abutted against a bottom plate portion 103a of the closure shell 103.

In FIG. 5, the bottom plate portion 103a of the closure shell 103 corresponds to the larger diameter portion 16 of the igniter collar 13 in (a) in FIG. 1.

The inside of the first cup member 120 is a second combustion chamber and is filled with a second gas generating agent 150.

Although not depicted particularly in FIG. 5, the first opening means of the first cup member 120 can be any one depicted in (a) in FIG. 1, (b) and (c) in FIG. 2, and the second opening means of the second cup member 130 can be any one depicted in (a) in FIG. 1, (a) and (b) in FIG. 3.

Next, an operation of the gas generator 100 in FIG. 5 used as a gas generator for an automobile airbag apparatus will be described in the case that the first igniter 112 is actuated first and the second igniter 140 is actuated with delay.

When the first igniter 112 is actuated, the gas generating agent 114 for an ignition device in the first ignition device chamber cup 113 is ignited and burnt, and a combustion gas is generated.

The high temperature combustion gas flows into the first combustion chamber 110 through the through-hole 113a to ignite and burn the first gas generating agent 111 to generate a combustion gas.

The combustion gas generated in the first combustion chamber 110 passes through a coolant-filter 108, then ruptures a seal tape 106 and is discharged from a gas discharge port 105 to inflate an airbag.

When the first gas generating agent 111 is ignited and burnt and a combustion gas is generated, an inside of the first combustion chamber 110 is under high temperature. Thereby, an environment of the ignition device 1A is also under high temperature and particularly, the second cup member 130 in contact with the combustion gas and a combustion residue is under high temperature. At this time, since the second opening means of the second cup member 130 is closed by a seal tape, a seal cup, or the like from the outside, the second opening means is not ruptured.

Due to a heat insulating function of a gap (an air layer) 138 between the second cup member 130 and the first cup member 120, heat is hardly transferred from the second cup member 130 to the first cup member 120.

Thereby, a temperature rise inside the first cup member 120 is suppressed, and an erroneous ignition of the second gas generating agent 150 is prevented.

When the second igniter 140 is actuated with a slight delay after actuation of the first igniter 112, the second gas generating agent 150 is ignited and burnt and a combustion gas is generated.

The combustion gas generated in the first cup member 120 passes through a through-holes of the first cup member 120 to flow into the gap (the air layer) 138 and then passes through through-holes of the second cup member 130 to flow into the first combustion chamber 110.

Thereafter, the combustion gas passes through the coolant-filter 108 and is then discharged from the opened gas discharge port 105 to further inflate the airbag. As described above, when the ignition device of the present invention is used as the second combustion chamber of a pyrotechnic dual-type gas generator, the seal cup 37 or the seal tape 36 that closes the through-holes 35 is disposed from the outside of the circumferential wall 32 so that the second opening means is opened only when the combustion pressure of the second gas generating agent 150 is applied.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An ignition device, comprising:
    an igniter fixed to an igniter collar;
    a first cup member filled with a gas generating component therein, the first cup member having a first circumferential wall and a first bottom surface closing one end of the first circumferential wall; and
    a second cup member having a second circumferential wall opposing the first circumferential wall and a second bottom surface closing one end of the second circumferential wall and opposing the first bottom surface,
    the first cup member covering the igniter collar and enclosing an ignition portion of the igniter,
    the second cup member covering the igniter collar and enclosing the first cup member,
    a continuous gap, as a heat insulating layer, defined by an outer surface of the first circumferential wall and the first bottom surface of the first cup member and an inner surface of the second circumferential wall and the second bottom surface of the second cup member, the continuous gap being an air layer that contains no gas generating component therein,
    the first cup member having a first opening, and the second cup member having a second opening, and
    at least one of the first opening and the second opening being closed before actuation and being opened only when gas is generated from the gas generating component.

2. The ignition device according to claim 1, wherein the first cup member and the second cup member are arranged such that a first projection formed on the outer surface of the first cup member is abutted against the inner surface of the second cup member, or a second projection formed on the inner surface of the second cup member is abutted against the outer surface of the first cup member.

3. The ignition device according to claim 1, wherein the first cup member is made of a material having a lower thermal conductivity than the second cup member.

4. The ignition device according to claim 1, wherein the first cup member is made of a resin and the second cup member is made of a metal.

5. The ignition device according to claim 1, wherein the igniter collar has a metal portion and a low thermal conductivity portion made of a material having a lower thermal conductivity than the metal of the metal portion, and an opening of the first cup member and an inner circumferential wall at the opening thereof are in contact with the low thermal conductivity portion.

6. The ignition device according to claim 1, wherein the igniter collar has a smaller diameter portion, an intermediate diameter portion, and a larger diameter portion arranged in that order from the ignition portion in ascending order of outer diameters,
    the larger diameter portion is made of metal, and at least the smaller diameter portion includes a low thermal conductivity portion made of a material having a lower thermal conductivity than the metal of the metal portion,
    a first annular surface is formed between the smaller diameter portion and the intermediate diameter portion, being obtained by a difference in outer diameters thereof, and a second annular surface is formed between the intermediate diameter portion and the larger diameter portion, being obtained by a difference in outer diameters thereof, and
    the first cup member has an opening abutting against the first annular surface, and an inner circumferential wall at the opening is press-fitted to the smaller diameter portion.

7. A seat belt retractor comprising:
    a gas generator including the ignition device according to claim 1.

8. A gas generator comprising:
    a housing having a gas discharge port;
    an ignition device provided inside the housing; and
    a combustion chamber filled with a gas generating agent, provided inside the housing, wherein
    the ignition device according to claim 1 is used as the ignition device.

9. A gas generator comprising:
    a housing having a gas discharge port;
    an ignition device provided inside the housing;
    a first combustion chamber filled with a first gas generating agent, provided inside the housing; and
    a second combustion chamber filled with a second gas generating agent, provided inside the housing, wherein
    the ignition device according to claim 1 is used as the second combustion chamber.

* * * * *